(12) United States Patent
Wei et al.

(10) Patent No.: US 9,716,651 B2
(45) Date of Patent: Jul. 25, 2017

(54) DISTRIBUTED LINK AGGREGATION GROUP SERVICE HANDOVER METHOD AND DEVICE

(71) Applicant: ZTE CORPORATION, Shenzhen, Guangdong Province (CN)

(72) Inventors: Yuehua Wei, Shenzhen (CN); Xueqiong Xu, Shenzhen (CN); Zhongming Sun, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 124 days.

(21) Appl. No.: 14/437,885

(22) PCT Filed: Oct. 10, 2013

(86) PCT No.: PCT/CN2013/084987
§ 371 (c)(1),
(2) Date: Apr. 23, 2015

(87) PCT Pub. No.: WO2014/063571
PCT Pub. Date: May 1, 2014

(65) Prior Publication Data
US 2015/0271068 A1 Sep. 24, 2015

(30) Foreign Application Priority Data
Oct. 24, 2012 (CN) .......................... 2012 1 0410246

(51) Int. Cl.
*H04J 1/16* (2006.01)
*H04L 12/721* (2013.01)
(Continued)

(52) U.S. Cl.
CPC ............ *H04L 45/70* (2013.01); *H04L 41/065* (2013.01); *H04L 41/0668* (2013.01);
(Continued)

(58) Field of Classification Search
CPC ............... H04L 41/065; H04L 41/0668; H04L 43/0817; H04L 45/44; H04L 45/70; H04W 36/00
See application file for complete search history.

(56) References Cited

U.S. PATENT DOCUMENTS

| | | |
|---|---|---|
| 2002/0131437 A1 | 9/2002 | Tagore-Brage |
| 2003/0061533 A1 | 3/2003 | Perloff et al. |

(Continued)

FOREIGN PATENT DOCUMENTS

| | | |
|---|---|---|
| CN | 101159504 A | 4/2008 |
| CN | 101674240 A | 3/2010 |

(Continued)

OTHER PUBLICATIONS

CN101674240 (English Translation), ZTE Corp, Mar. 17, 2010, pp. 7-21.*

(Continued)

*Primary Examiner* — Kan Yuen
(74) *Attorney, Agent, or Firm* — Ling Wu; Stephen Yang; Ling and Yang Intellectual Property (57) ABSTRACT

A method and device for distributed link aggregation group service handover are disclosed in the present document. The method includes: when an unavailable port appears in a distributed link aggregation intra-end system, the intra-end system determining a service currently corresponding to the unavailable port as a service to be handed over; or, when an unavailable intra-end system appears in a distributed link aggregation portal, an adjacent intra-end system of the intra-end system determining a service currently corresponding to the unavailable intra-end system as a service to be handed over; and the intra-end system that determines the service to be handed over determining a backup port of the service according to a port sequence configured for the service in advance, canceling a corresponding relationship (Continued)

between the service and the unavailable port, and establishing a corresponding relationship between the service and the backup port.

20 Claims, 3 Drawing Sheets (51) Int. Cl.
H04W 36/00 (2009.01)
H04L 12/26 (2006.01)
H04L 12/24 (2006.01)

(52) U.S. Cl.
CPC .......... *H04L 43/0817* (2013.01); *H04L 45/44* (2013.01); *H04W 36/00* (2013.01)

(56) References Cited

U.S. PATENT DOCUMENTS

2008/0112312 A1  5/2008  Hermsmeyer et al.
2011/0310729 A1* 12/2011 Raman ................ G06F 11/2007
                                                 370/225
2015/0172121 A1*  6/2015 Farkas ................. H04L 45/245
                                                 370/218

FOREIGN PATENT DOCUMENTS

CN    101674240 A   3/2010
CN    102208999 A   10/2011
EP    1921808 A1    5/2008

OTHER PUBLICATIONS

Draft Standard for Local and Metropolitan Area Networks-Link Aggregation; Sponsor LAN MAN Standards Committee of the IEEE Computer Society; IEEE P 802.1 AX-REVTM/ D0.4.

* cited by examiner

DISTRIBUTED LINK AGGREGATION GROUP SERVICE HANDOVER METHOD AND DEVICE

TECHNICAL FIELD

The present document relates to a technique of network communication protection, and particularly, to a method and device for distributed link aggregation group service handover.

BACKGROUND

With the rapid development of broadband services, the interconnection between networks is used more and more and bears more services. A protection can be made on links and nodes thereon by adopting various methods inside a network according to the technology the network uses. With an increasingly stronger protection demand for traffics and its higher and higher requirements, certain operators also propose a protection demand required for network junction areas. A way of link aggregation can be used for implementing the protection. The common way can be the link aggregation and it can also be the loop protection. The ring network protection technology is limited by network topology, which is not applicable to the network junction parts which are in a fully connected network way. In the existing standard 802.1AX-link aggregation of the Institute of Electrical and Electronic Engineers (IEEE), a protection of multiple links can be achieved, but it is limited to support the link aggregation of a single node, which cannot satisfy a demand for node protection.

In order to adapt to a higher diversification of networking ways in inter-network junction areas and to implement the protection of links and edge nodes, the IEEE standard organization proposes to implement Distributed Resilient Network Interconnect (DRNI) by extending the 802.1AX-link aggregation, so as to support the multi-node link aggregation. The 802.1AX is extended by the DRNI, which makes that each end of a link aggregation group can be a logical node constituted by one or more nodes for the aggregation, that is, a distributed Link Aggregation Group (LAG) is constituted by multiple links of these nodes, thereby guaranteeing a dual protection for links and nodes of the network junction areas.

Figure 1:
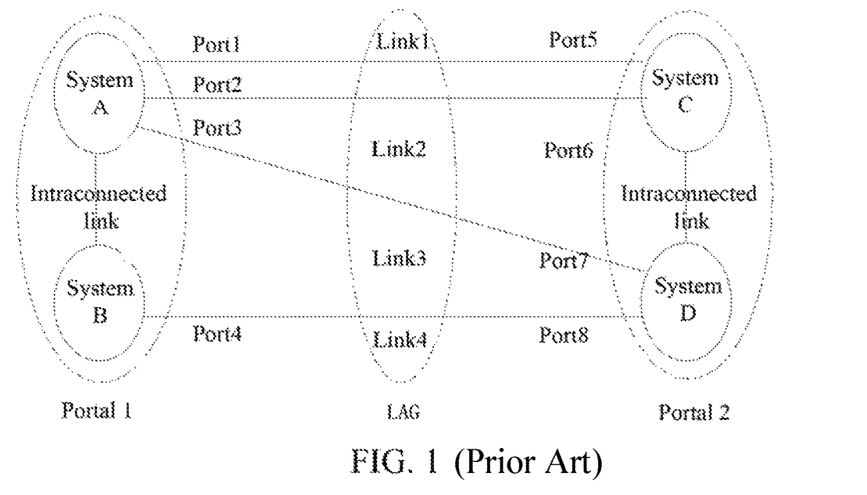
FIG. 1 is a schematic diagram of networking.

As shown in FIG. 1, both ends of the LAG are respectively composed of one portal (Portal), each portal consists of two systems, wherein, a portal 1 (Portal1) is composed of a system A and a system B, the system A and system B are called "intra-end systems" (called "system" for short) of the Portal1, the system A and the system B are systems adjacent to each other. A portal 2 (Portal2) is composed of a system C and a system D. A link 1, link 2, link 3 and link 4 between the Portal1 and the Portal2 are aggregated into a distributed LAG.

At present, a distribution way according to service messages is used in the DRNI, when a node receives a message, the service message is forwarded according to an identifier (e.g., a Virtual Local Area Network Identifier (VLAN ID, called VID for short)) of the service message. When the node receives a message required to be sent to the interior of the current network or a message required to be sent to a Network Node Interface (NNI) side via an aggregated link of the current node, it is required to judge whether a service identifier of the message is in a port service table and an aggregator service table, if the VID is in the port service table, the message is forwarded, and if the VID is not in the port service table, the message is discarded. When a failure occurs in the link or node, it is required to hand over the service to other ports or other nodes to send, but there is no such service at other ports or nodes, which causes that the service is discarded and traffic is interrupted.

With respect to this situation, there is no solution at present about how to ensure that fast service handover is implemented by renegotiating to select an aggregated link between the nodes when a failure occurs in the link or node so as to reduce the influence of the failure on the service.

SUMMARY

The present document provides a method and device for distributed link aggregation group service handover, and when an LAG member is changed, traffics can be swiftly handed over to other links for transmission.

A method for distributed Link Aggregation Group (LAG) service handover provided in the present document comprises:

when an unavailable port appears in a distributed link aggregation intra-end system, the intra-end system determining a service currently corresponding to the unavailable port as a service to be handed over; or, when an unavailable intra-end system appears in a distributed link aggregation portal, an adjacent intra-end system of the intra-end system determining a service currently corresponding to the unavailable intra-end system as a service to be handed over; and the intra-end system that determines the service to be handed over determining a backup port of the service to be handed over according to a port sequence configured for the service to be handed over in advance, canceling a corresponding relationship between the service to be handed over and the unavailable port, and establishing a corresponding relationship between the service to be handed over and the backup port.

Alternatively, when an unavailable port appears in a distributed link aggregation intra-end system, and the intra-end system determines a service currently corresponding to the unavailable port as a service to be handed over, the intra-end system canceling a corresponding relationship between the service to be handed over and the unavailable port, and establishing a corresponding relationship between the service to be handed over and the backup port comprises:

if judging that the backup port and the unavailable port belong to a same intra-end system, canceling the corresponding relationship between the service to be handed over and the unavailable port, and establishing the corresponding relationship between the service to be handed over and the backup port; and if judging that the backup port and the unavailable port do not belong to the same intra-end system, canceling the corresponding relationship between the service to be handed over and the unavailable port, and sending a service handover message to an intra-end system to which the backup port belongs, wherein the service handover message is set to make the intra-end system to which the backup port belongs establish the corresponding relationship between the service to be handed over and the backup port.

Alternatively, when an unavailable intra-end system appears in a distributed link aggregation portal, and an adjacent intra-end system of the intra-end system determines a service currently corresponding to the unavailable intra-end system as a service to be handed over, the adjacent intra-end system canceling a corresponding relationship between the service to be handed over and the unavailable port, and establishing a corresponding relationship between the service to be handed over and the backup port comprises:

canceling the corresponding relationship between the service to be handed over and the unavailable port, if judging that the backup port belongs to the current system, establishing the corresponding relationship between the service to be handed over and the backup port; and if judging that the backup port belongs to other intra-end systems belonging to a same portal with the current intra-end system, sending a service handover message to the intra-end system to which the backup port belongs, wherein the service handover message is set to make the intra-end system to which the backup port belongs establish the corresponding relationship between the service to be handed over and the backup port.

Alternatively, the service handover message comprises the following information: a target system identifier and a corresponding relationship between the service to be handed over and the backup port.

Alternatively, the service handover message further comprises one or more of the following information: a source system identifier and information of the unavailable port.

Alternatively, determining a backup port of the service to be handed over according to a port sequence configured for the service to be handed over in advance comprises:

determining a port with a highest priority in available ports of the service to be handed over in the port sequence configured for the service to be handed over in advance as the backup port; or determining a port with a highest priority in available ports belonging to a same intra-end system with the unavailable port of the service to be handed over in the port sequence configured for the service to be handed over in advance as the backup port.

Alternatively, the method further comprises:

when the unavailable port recovers to be available, and an LAG runs in a revertive mode, an intra-end system to which the port recovering to be available belongs checking a service that should be carried on the port recovering to be available and a priority of the port recovering to be available in a port sequence configured for the service in advance, with respect to each the service, if the intra-end system judges that the priority of the port recovering to be available in the port sequence configured for the service in advance is greater than a priority of a port currently carrying the service in the port sequence configured for the service in advance, canceling a corresponding relationship between the service and the port currently carrying the service, and establishing a corresponding relationship between the service and the port recovering to be available; or when the unavailable intra-end system recovers to be available, and an LAG runs in a revertive mode, the intra-end system recovering to be available checking a service that should be carried on the current intra-end system and a priority of an available port of the current intra-end system in a port sequence configured for the service in advance, with respect to each the service, if the intra-end system judges that the priority of the available port of the current intra-end system in the port sequence configured for the service in advance is greater than a priority of a port currently carrying the service in the port sequence configured for the service in advance, canceling a corresponding relationship between the service and the port currently carrying the service, and establishing a corresponding relationship between the service and the available port of the current intra-end system.

Alternatively, an intra-end system to which the port recovering to be available belongs canceling a corresponding relationship between the service and the port currently carrying the service, and establishing a corresponding relationship between the service and the port recovering to be available comprises:

if judging that the port recovering to be available and the port currently carrying the service belong to the same intra-end system, canceling the corresponding relationship between the service and the port currently carrying the service, and establishing the corresponding relationship between the service and the port recovering to be available; and if judging that the port recovering to be available and the port currently carrying the service do not belong to the same intra-end system, reestablishing the corresponding relationship between the service and the port recovering to be available, and sending a service reverse switchback message to an intra-end system to which the port currently carrying the service belongs, wherein the service reverse switchback message is set to make the intra-end system to which the port currently carrying the service belongs cancel the corresponding relationship between the service and the port currently carrying the service.

Alternatively, the intra-end system recovering to be available canceling a corresponding relationship between the service and the port currently carrying the service, and establishing a corresponding relationship between the service and the available port of the current intra-end system comprises:

establishing the corresponding relationship between the service and the available port of the current intra-end system, and sending a service reverse switchback message to an intra-end system to which the port currently carrying the service belongs, wherein the service reverse switchback message is set to make the intra-end system to which the port currently carrying the service belongs cancel the corresponding relationship between the service and the port currently carrying the service.

Alternatively, the service reverse switchback message comprises the following information: a source system identifier, a target system identifier and a corresponding relationship between the service and the port recovering to be available.

Alternatively, the service reverse switchback message further comprises one or more of the following information: a source system identifier and information of the port currently carrying the service.

The present document further provides a device for distributed Link Aggregation Group (LAG) service handover, which is located in a distributed link aggregation intra-end system, and comprises: a service to be handed over determination module and a corresponding relationship reestablishment module, wherein:

the service to be handed over determination module is configured to: when an unavailable port appears in the current distributed link aggregation intra-end system, determine a service currently corresponding to the unavailable port as a service to be handed over; and when an adjacent intra-end system is unavailable, determine a service currently corresponding to the unavailable intra-end system as a service to be handed over; and the corresponding relationship reestablishment module is configured to: determine a backup port of the service to be handed over according to a port sequence configured for the service to be handed over in advance, cancel a corresponding relationship between the service to be handed over and the unavailable port, and establish a corresponding relationship between the service to be handed over and the backup port.

Alternatively, the corresponding relationship reestablishment module comprises a backup port determination submodule, a first judgment submodule, a first reestablishment submodule and a second reestablishment submodule, wherein:

the backup port determination submodule is configured to: determine the backup port of the service to be handed over according to the port sequence configured for the service to be handed over in advance;

the first judgment submodule is configured to: when the unavailable port appears in the current distributed link aggregation intra-end system, judge whether the backup port and the unavailable port belong to a same intra-end system;

the first reestablishment submodule is configured to: when the first judgment submodule judges that the backup port and the unavailable port belong to the same intra-end system, cancel the corresponding relationship between the service to be handed over and the unavailable port, and establish the corresponding relationship between the service to be handed over and the backup port; and the second reestablishment submodule is configured to: when the first judgment submodule judges that the backup port and the unavailable port do not belong to the same intra-end system, cancel the corresponding relationship between the service to be handed over and the unavailable port, and send a service handover message to an intra-end system to which the backup port belongs, wherein the service handover message is set to make the intra-end system to which the backup port belongs establish the corresponding relationship between the service to be handed over and the backup port.

Alternatively, the corresponding relationship reestablishment module comprises a backup port determination submodule, a second judgment submodule, a third reestablishment submodule, a fourth reestablishment submodule and a fifth reestablishment submodule, wherein:

the backup port determination submodule is configured to: determine the backup port of the service to be handed over according to the port sequence configured for the service to be handed over in advance;

the third reestablishment submodule is configured to: when the adjacent intra-end system is unavailable, cancel the corresponding relationship between the service to be handed over and the unavailable port;

the second judgment submodule is configured to: when the adjacent intra-end system is unavailable, judge whether the backup port belongs to the current system;

the fourth reestablishment submodule is configured to: when the second judgment submodule judges that the backup port belongs to the current system, establish the corresponding relationship between the service to be handed over and the backup port; and the fifth reestablishment submodule is configured to: when the second judgment submodule judges that the backup port belongs to other intra-end systems belonging to a same portal with the current intra-end system, send a service handover message to the intra-end system to which the backup port belongs, wherein the service handover message is set to make the intra-end system to which the backup port belongs establish the corresponding relationship between the service to be handed over and the backup port.

Alternatively, the service handover message comprises the following information: a target system identifier and a corresponding relationship between the service to be handed over and the backup port.

Alternatively, the service handover message further comprises one or more of the following information: a source system identifier and information of the unavailable port.

Alternatively, the corresponding relationship reestablishment module determining a backup port of the service to be handed over according to a port sequence configured for the service to be handed over in advance comprises:

determining a port with a highest priority in available ports of the service to be handed over in the port sequence configured for the service to be handed over in advance as the backup port; or determining a port with a highest priority in available ports belonging to a same intra-end system with the unavailable port of the service to be handed over in the port sequence configured for the service to be handed over in advance as the backup port.

Alternatively, the device further comprises a first switchback module, configured to: when the unavailable port recovers to be available, and an LAG runs in a revertive mode, check a service that should be carried on the port recovering to be available and a priority of the port recovering to be available in a port sequence configured for the service in advance, with respect to each the service, if judging that the priority of the port recovering to be available in the port sequence configured for the service in advance is greater than a priority of a port currently carrying the service in the port sequence configured for the service in advance, cancel a corresponding relationship between the service and the port currently carrying the service, and establish a corresponding relationship between the service and the port recovering to be available.

Alternatively, the first switchback module canceling a corresponding relationship between the service and the port currently carrying the service, and establishing a corresponding relationship between the service and the port recovering to be available comprises:

if judging that the port recovering to be available and the port currently carrying the service belong to the same intra-end system, canceling the corresponding relationship between the service and the port currently carrying the service, and establishing the corresponding relationship between the service and the port recovering to be available; and if judging that the port recovering to be available and the port currently carrying the service do not belong to the same intra-end system, reestablishing the corresponding relationship between the service and the port recovering to be available, and sending a service reverse switchback message to an intra-end system to which the port currently carrying the service belongs, wherein the service reverse switchback message is set to make the intra-end system to which the port currently carrying the service belongs cancel the corresponding relationship between the service and the port currently carrying the service.

Alternatively, the device further comprises a second switchback module, configured to: when the current intra-end system recovers to be available from an unavailable intra-end system, and an LAG runs in a revertive mode, check a service that should be carried on the current intra-end system and a priority of an available port of the current intra-end system in a port sequence configured for the service in advance, with respect to each the service, if judging that the priority of the available port of the current intra-end system in the port sequence configured for the service in advance is greater than a priority of a port currently carrying the service in the port sequence configured for the service in advance, cancel a corresponding relationship between the service and the port currently carrying the service, and establish a corresponding relationship between the service and the available port of the current intra-end system.

Alternatively, the second switchback module canceling a corresponding relationship between the service and the port currently carrying the service, and establishing a corresponding relationship between the service and the available port of the current intra-end system comprises:

establishing the corresponding relationship between the service and the available port of the current intra-end system, and sending a service reverse switchback message to an intra-end system to which the port currently carrying the service belongs, wherein the service reverse switchback message is set to make the intra-end system to which the port currently carrying the service belongs cancel the corresponding relationship between the service and the port currently carrying the service.

Alternatively, the service reverse switchback message comprises the following information: a source system identifier, a target system identifier and a corresponding relationship between the service and the port recovering to be available.

Alternatively, the service reverse switchback message further comprises one or more of the following information: a source system identifier and information of the port currently carrying the service.

The present document provides a distributed LAG protection method and device for performing message distribution based on the service, when an LAG member is changed, a corresponding relationship between the port and the service can be dynamically updated, which enables the service influenced by the failure to be swiftly handed over to other links for transmission. With the present document, the influence on an adjacent system is minimized in a service handover process, which greatly improves both performance and efficiency.

After reading the detailed descriptions of the embodiment of the present document in combination with the accompanying drawings, characteristics and advantages of the present document will be more clear.

PREFERRED EMBODIMENT OF THE DOCUMENT

The examples of the present document will be described in detail in combination with the accompanying drawings below. It should be noted that the examples and the characteristics in the examples in the present document can be optionally combined with each other in the condition of no conflict.

Example 1

Figure 2:
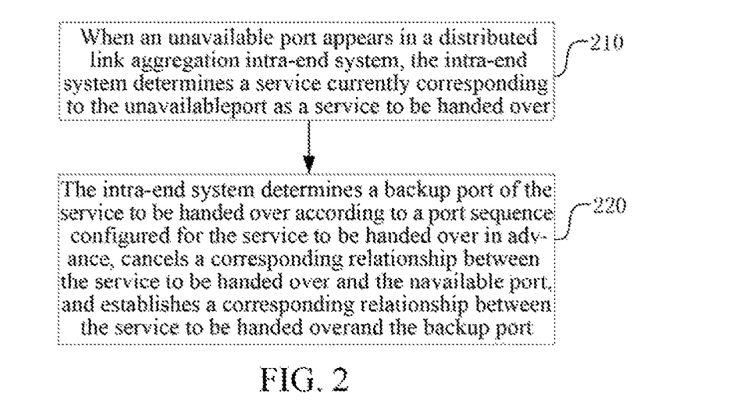
FIG. 2 is a flow diagram according to the example 1 of the present document.

The example describes a method for distributed LAG service handover, and as shown in FIG. 2, the following steps are included.

In step 210, when an unavailable port appears in a distributed link aggregation intra-end system, the intra-end system determines a service currently corresponding to the unavailable port as a service to be handed over.

The port mentioned in the present document can be a physical port and it also can be a logical port. The unavailable port mentioned in the present document refers to a port that cannot implement a link aggregation function, such as a port that cannot perform message transceiving. When a port itself has a failure (for example, it is set as disable), the port is an unavailable port; or when a link has a failure, ports at both ends of the link in failure are unavailable port; or when an intra-end system has a failure (such as a power failure), all ports contained in the intra-end system in failure are unavailable ports.

The service herein refers to a data flow or a session that can be marked, and the service can be marked with an Ethernet Virtual Local Area Network Identifier (VLANID), a Backbone Service Instance Identifier (I-SID) or a session ID and so on.

In step 220, the intra-end system that determines the service to be handed over (i.e. the intra-end system to which the unavailable port belongs) determines a backup port of the service to be handed over according to a port sequence configured for the service to be handed over in advance, cancels a corresponding relationship between the service to be handed over and the unavailable port, and establishes a corresponding relationship between the service to be handed over and the backup port.

The above step of updating (including canceling and establishing) a corresponding relationship between the service and the port specifically includes:

if judging that the backup port and the unavailable port belong to the same intra-end system, canceling the corresponding relationship between the service to be handed over and the unavailable port, and establishing the corresponding relationship between the service to be handed over and the backup port; and if judging that the backup port and the unavailable port do not belong to the same intra-end system, canceling the corresponding relationship between the service to be handed over and the unavailable port, and sending a service handover message to an intra-end system to which the backup port belongs, wherein the service handover message is set to make the intra-end system to which the backup port belongs establish the corresponding relationship between the service to be handed over and the backup port.

The above service handover message includes the following information: a target system identifier and a corresponding relationship between the service to be handed over and the backup port. Preferably, it can also include one or more of the following information: a source system identifier and information of the unavailable port. The source system identifier for example can be used for judging a legality of the message.

The above determination of the backup port of the service to be handed over according to the port sequence configured for the service to be handed over in advance can be implemented in any one of the following ways:

determining a port with a highest priority in available ports of the service to be handed over in the port sequence configured for the service to be handed over in advance as the backup port; or determining a port with a highest priority in available ports belonging to the same intra-end system as the unavailable port of the service to be handed over in the port sequence configured for the service to be handed over in advance as the backup port.

When there is a message of the service to be handed over, the message is forwarded via the backup port corresponding to the service to be handed over.

When the unavailable port recovers to be available, and the LAG runs in a revertive mode, an intra-end system to which the port recovering to be available belongs checks a service that should be carried on the port recovering to be available and a priority of the port recovering to be available in the port sequence configured for the service in advance, and with respect to each service, if the intra-end system judges that the priority of the port recovering to be available in the port sequence configured for the service in advance is greater than the priority of a port currently carrying the service in the port sequence configured for the service in advance, cancels a corresponding relationship between the service and the port currently carrying the service, and establishes a corresponding relationship between the service and the port recovering to be available.

In a preferred example, the intra-end system to which the port recovering to be available belongs canceling a corresponding relationship between the service and the port currently carrying the service, and establishing a corresponding relationship between the service and the port recovering to be available includes:

if judging that the port recovering to be available and the port currently carrying the service belong to the same intra-end system, canceling the corresponding relationship between the service and the port currently carrying the service, and establishing the corresponding relationship between the service and the port recovering to be available; and if judging that the port recovering to be available and the port currently carrying the service do not belong to the same intra-end system, reestablishing the corresponding relationship between the service and the port recovering to be available, and sending a service reverse switchback message to an intra-end system to which the port currently carrying the service belongs, wherein the service reverse switchback message is set to make the intra-end system to which the port currently carrying the service belongs cancel the corresponding relationship between the service and the port currently carrying the service.

The above service reverse switchback message includes the following information: a source system identifier, a target system identifier and a corresponding relationship between the service and the port recovering to be available. Preferably, it can also include one or more of the following information: a source system identifier and information of the port currently carrying the service.

Example 2

Figure 3:
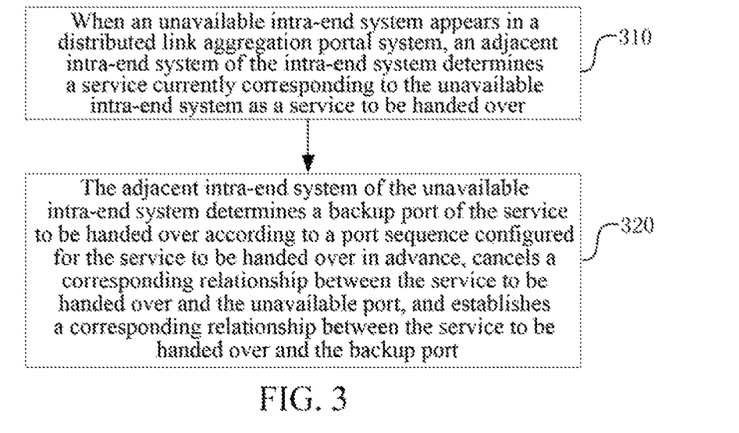
FIG. 3 is a flow diagram according to the example 2 of the present document.

The difference between the example and the example 1 is that, when the unavailable ports include all ports of one intra-end system, that is, the intra-end system is in an unavailable state, as shown in FIG. 3, the following steps are included (the detailed descriptions of the steps below are mainly related to differences between the example and the example 1, and the parts identical with those in the example 1 will not be described in detail).

In step 310, when an unavailable intra-end system appears in a distributed link aggregation portal, an adjacent intra-end system of the intra-end system determines a service currently corresponding to the unavailable intra-end system as a service to be handed over.

At this point, the service to be handed over includes all services of the unavailable intra-end system.

In step 320, the intra-end system that determines the service to be handed over (i.e. the adjacent intra-end system of the unavailable intra-end system) determines a backup port of the service to be handed over according to a port sequence configured for the service to be handed over in advance, cancels a corresponding relationship between the service to be handed over and the unavailable port, and establishes a corresponding relationship between the service to be handed over and the backup port.

The above step of updating (including canceling and establishing) a corresponding relationship between the service and the port specifically includes:

canceling the corresponding relationship between the service to be handed over and the unavailable port, if judging that the backup port belongs to the current system, establishing the corresponding relationship between the service to be handed over and the backup port; and if judging that the backup port belongs to other intra-end systems belonging to the same portal as the current intra-end system, sending a service handover message to the intra-end system to which the backup port belongs, wherein the service handover message is set to make the intra-end system to which the backup port belongs establish the corresponding relationship between the service to be handed over and the backup port.

When the unavailable intra-end system recovers to be available, and the LAG runs in a revertive mode, the intra-end system recovering to be available checking a service that should be carried on the current intra-end system and the priority of the available port of the current intra-end system in a port sequence configured for the service in advance, with respect to each service, if the intra-end system judges that the priority of the available port of the current intra-end system in the port sequence configured for the service in advance is greater than the priority of the port currently carrying the service in the port sequence configured for the service in advance, canceling a corresponding relationship between the service and the port currently carrying the service, and establishing a corresponding relationship between the service and the available port of the current intra-end system.

Specifically, the intra-end system recovering to be available canceling a corresponding relationship between the service and the port currently carrying the service, and establishing a corresponding relationship between the service and the available port of the current intra-end system includes:

establishing the corresponding relationship between the service and the available port of the current intra-end system, and sending a service reverse switchback message to an intra-end system to which the port currently carrying the service belongs, wherein the service reverse switchback message is set to make the intra-end system to which the port currently carrying the service belongs cancel the corresponding relationship between the service and the port currently carrying the service.

Example 3

Figure 4:
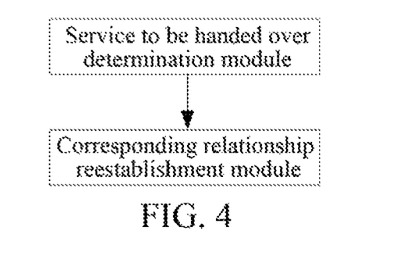
FIG. 4 is a schematic diagram of a structure of a handover device according to the example 3 of the present document.

The example introduces a handover device for implementing the method in the above example 1 and example 2, which is located in a distributed link aggregation intra-end system. For an intra-end system, it may encounter a situation that an unavailable port appears in the current intra-end system and an adjacent intra-end system is unavailable at the same time, thus the device can deal with the situations appearing in the example 1 and example 2 simultaneously, and as shown in FIG. 4, a service to be handed over determination module and a corresponding relationship reestablishment module are included, wherein:

the service to be handed over determination module is configured to: when an unavailable port appears in the current distributed link aggregation intra-end system, determine a service currently corresponding to the unavailable port as a service to be handed over; and when an adjacent intra-end system is unavailable, determine a service currently corresponding to the unavailable intra-end system as a service to be handed over; and the corresponding relationship reestablishment module is configured to: determine a backup port of the service to be handed over according to a port sequence configured for the service to be handed over in advance, cancel a corresponding relationship between the service to be handed over and the unavailable port, and establish a corresponding relationship between the service to be handed over and the backup port.

Figure 5:
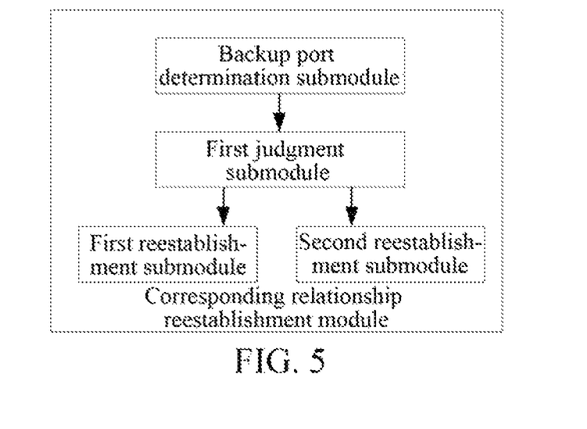
FIG. 5 is a schematic diagram of a corresponding relationship reestablishment module performing receiving in the example 3 of the present document.

In one preferred example with respect to the unavailable port, the above corresponding relationship reestablishment module can include a backup port determination submodule, a first judgment submodule, a first reestablishment submodule and a second reestablishment submodule as shown in FIG. 5, wherein:

the backup port determination submodule is configured to: determine the backup port of the service to be handed over according to the port sequence configured for the service to be handed over in advance;

the first judgment submodule is configured to: when the unavailable port appears in the current distributed link aggregation intra-end system, judge whether the backup port and the unavailable port belong to the same intra-end system;

the first reestablishment submodule is configured to: when the first judgment submodule judges that the backup port and the unavailable port belong to the same intra-end system, cancel the corresponding relationship between the service to be handed over and the unavailable port, and establish the corresponding relationship between the service to be handed over and the backup port; and the second reestablishment submodule is configured to: when the first judgment submodule judges that the backup port and the unavailable port do not belong to the same intra-end system, cancel the corresponding relationship between the service to be handed over and the unavailable port, and send a service handover message to an intra-end system to which the backup port belongs, wherein the service handover message is set to make the intra-end system to which the backup port belongs establish the corresponding relationship between the service to be handed over and the backup port.

With respect to a scenario that the unavailable port recovers to be an available port, in a preferred example, the device also includes a first switchback module, configured to: when the unavailable port recovers to be available, and the LAG runs in a revertive mode, check a service that should be carried on the port recovering to be available and the priority of the port recovering to be available in a port sequence configured for the service in advance, with respect to each service, if judging that the priority of the port recovering to be available in the port sequence configured for the service in advance is greater than a priority of a port currently carrying the service in the port sequence configured for the service in advance, cancel a corresponding relationship between the service and the port currently carrying the service, and establish a corresponding relationship between the service and the port recovering to be available.

The above first switchback module canceling a corresponding relationship between the service and the port currently carrying the service, and establishing a corresponding relationship between the service and the port recovering to be available includes:

if judging that the port recovering to be available and the port currently carrying the service belong to the same intra-end system, canceling the corresponding relationship between the service and the port currently carrying the service, and establishing the corresponding relationship between the service and the port recovering to be available; and if judging that the port recovering to be available and the port currently carrying the service do not belong to the same intra-end system, reestablishing the corresponding relationship between the service and the port recovering to be available, and sending a service reverse switchback message to an intra-end system to which the port currently carrying the service belongs, wherein the service reverse switchback message is set to make the intra-end system to which the port currently carrying the service belongs cancel the corresponding relationship between the service and the port currently carrying the service.

Figure 6:
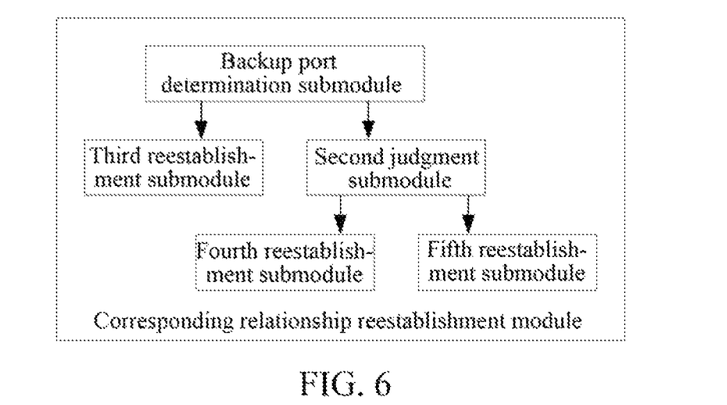
FIG. 6 is another schematic diagram of a corresponding relationship reestablishment module performing receiving in the example 3 of the present document.

In another preferred example with respect to the unavailable system, the above corresponding relationship reestablishment module can include a backup port determination submodule, a second judgment submodule, a third reestablishment submodule, a fourth reestablishment submodule and a fifth reestablishment submodule as shown in FIG. 6, wherein:

the backup port determination submodule is configured to: determine the backup port of the service to be handed over according to the port sequence configured for the service to be handed over in advance;

the third reestablishment submodule is configured to: when the adjacent intra-end system is unavailable, cancel the corresponding relationship between the service to be handed over and the unavailable port;

the second judgment submodule is configured to: when the adjacent intra-end system is unavailable, judge whether the backup port belongs to the current system;

the fourth reestablishment submodule is configured to: when the second judgment submodule judges that the backup port belongs to the current system, establish the corresponding relationship between the service to be handed over and the backup port; and the fifth reestablishment submodule is configured to: when the second judgment submodule judges that the backup port belongs to other intra-end systems belonging to the same portal with the current intra-end system, send a service handover message to the intra-end system to which the backup port belongs, wherein the service handover message is set to make the intra-end system to which the backup port belongs establish the corresponding relationship between the service to be handed over and the backup port.

With respect to a scenario that the unavailable port recovers to be an available port, in a preferred example, the device further includes a second switchback module, configured to: when the current intra-end system recovers to be available from an unavailable intra-end system, and the LAG runs in a revertive mode, check a service that should be carried on the current intra-end system and a priority of an available port of the current intra-end system in a port sequence configured for the service in advance, and with respect to each service, if judging that the priority of the available port of the current intra-end system in the port sequence configured for the service in advance is greater than the priority of a port currently carrying the service in the port sequence configured for the service in advance, cancel a corresponding relationship between the service and the port currently carrying the service, and establish a corresponding relationship between the service and the available port of the current intra-end system.

The above second switchback module canceling a corresponding relationship between the service and the port currently carrying the service, and establishing a corresponding relationship between the service and the available port of the current intra-end system includes:

establishing the corresponding relationship between the service and the available port of the current intra-end system, and sending a service reverse switchback message to an intra-end system to which the port currently carrying the service belongs, wherein the service reverse switchback message is set to make the intra-end system to which the port currently carrying the service belongs cancel the corresponding relationship between the service and the port currently carrying the service.

The contents of the service handover message and service reverse switchback message in the example may refer to the descriptions in the example 1.

The "configured as" or "configured to" mentioned in the present document shows functions of a subject, for example, it represents functions of a certain module, or it represents functions of a certain message.

The contents of the above examples will be illustrated in detail in combination with actual scenarios through several application examples below. In the following examples, a service configuration, a running state and a corresponding relationship between the port and the service are recorded or reflected through a plurality of tables. The skilled in the art also can perform recording in other ways according to contents of the related art. The following application examples and the characteristics in the application examples can be optionally combined with each other in the condition of no conflict.

Application Example 1

As shown in FIG. 1, both ends of the LAG are respectively composed of one portal, each portal consists of two intra-end systems (called systems for short), wherein, a Portal 1 is composed of a system A and a system B, the system A and system B are systems adjacent to each other. A Portal2 is composed of a system C and a system D, the system C and system D are systems adjacent to each other. A link 1, link 2, link 3 and link 4 between the Portal1 and the Portal2 are aggregated into a distributed LAG. Descriptions will be made by taking a method for information interaction and service distribution of the Portal 1 as an example below, and the information processing way of the Portal 2 may refer to that of the Portal 1.

It is assumed that the port 1, port 2, port 3 and port 4 are all available ports in the LAG, and an information table of ports within the Portal 1 is as shown in Table 0.

TABLE 0

| Port information table of Portal 1 | | | | |
| --- | --- | --- | --- | --- |
| Port number | Port state | System in which a port is located | ... | ... |
| port 1 | available | system A | | |
| port 2 | available | system A | | |
| port 3 | available | system A | | |
| port 4 | available | system B | | |

The system A and system B in the Portal 1 obtain a service port table through configuration negotiation and synchronization, the service port table is used for recording a port sequence sending the service (or bearing the service) configured for the service in advance (the port sequence can be used for reflecting a priority order of sending ports). As shown in Table 1, by taking a service 101 as an example, the port 1 is preferably used to send a message of the service 101, and when the port 1 has a failure, the port 2 is preferably selected to send, and so on.

TABLE 1

| Service port table of Portal1 | |
| --- | --- |
| Service | Port sequence |
| 101 | port 1, port 2, port 3, port 4 |
| 102 | port 1, port 2, port 3, port 4 |
| 103 | port 1, port 4, port 2, port 3 |
| 104 | port 1, port 4, port 2, port 3 |
| 105 | port 2, port 3, port 4, port 1 |
| 106 | port 2, port 3, port 4, port 1 |
| 107 | port 3, port 1, port 2 |
| 108 | port 3, port 1, port 2 |
| 109 | port 4, port 1, port 2, port 3 |
| 110 | port 4, port 1, port 2, port 3 |

According to Table 0 and Table 1, each of the system A and system B can generate its own port service table, the table reflects a running state, and records all services that are allowed to pass through the port. The port service table of the system A may refer to Table 2A, the port service table of the system B may refer to Table 2B, and with the port 1 of the system A as an example, a port service sequence 101-104 represents that services carried on the port 1 currently are services 101-104.

TABLE 2A

| Port service table of system A | |
| --- | --- |
| Port number | Port service sequence |
| port 1 | 101-104 |
| port 2 | 105-106 |
| port 3 | 107-108 |

TABLE 2B

| Port service table of system B | |
| --- | --- |
| Port number | Port service sequence |
| port 4 | 109-110 |

Table 3 is a service running table, which is used for recording information of the current port sending the service (a port identifier and a priority of the port in Table 1 are included in the example, or only the port identifier is included), a corresponding relationship between the service and the port in the table is identical with that in the port service table, after the LAG is initialized and enters a running state, information of the service running table is as shown in Table 3.

TABLE 3

Service running table of portal

| Service | Information of the Current sending port | |
|---|---|---|
| | Port number | Priority |
| 101 | port 1 | 1 |
| 102 | port 1 | 1 |
| 103 | port 1 | 1 |
| 104 | port 1 | 1 |
| 105 | port 2 | 1 |
| 106 | port 2 | 1 |
| 107 | port 3 | 1 |
| 108 | port 3 | 1 |
| 109 | port 4 | 1 |
| 110 | port 4 | 1 |

Both the port service table and the service running table are essentially used for reflecting the corresponding relationship between the service and the port, the port service table can be generated based on the service running table, and an important difference between the port service table and the service running table is that table look-up indexes are different.

Figure 7:
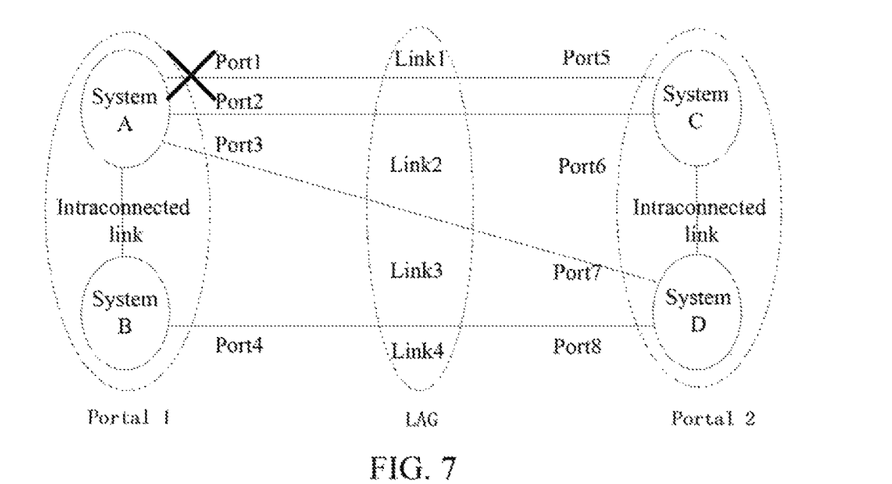
FIG. 7 is a schematic diagram of link failure.

As shown in FIG. 7, the system A detects that the link 1 has a failure, the state of the port 1 turns into unavailable, it is required to switch services on the port 1 to other links of the LAG at this point, and the following steps are included.

In step 101, the port state of the port 1 in the Table 0 is updated as unavailable, and Table 0-1 is the updated port information table.

TABLE 0-1

Port information table of Portal 1

| Port number | Port state | System in which a port is located | ... | ... |
|---|---|---|---|---|
| port 1 | unavailable | system A | | |
| port 2 | available | system A | | |
| port 3 | available | system A | | |
| port 4 | available | system B | | |

In step 102, according to the Table 2A, it is obtained that IDs of services to be handed over are 101, 102, 103 and 104, that is, it is determined that all the services currently corresponding to the unavailable port 1 are services to be handed over, the service sequence of the port 1 in the Table 2A is deleted, and Table 2A-1 is the updated port service table of the system A.

TABLE 2A-1

Port service table of system A

| Port number | Port service sequence |
|---|---|
| port 1 | ~~101 - 104~~ |
| port 2 | 105-106 |
| port 3 | 107-108 |

In step 103, the Table 1, Service port table of Portal 1, is searched by using the service ID 101 as an index, and it is determined that the port with a next highest priority of the service 101 is the port 2 and it is determined that the state of the port 2 is available after querying the Table 0-1, and thus it is determined that the backup port of the service 101 is the port 2 and its priority is 2.

In step 104, a service to be handed over temporary table with the port number as a major key is established, and with reference to Table 4, it records that the port 2 corresponds to the service 101.

In step 105, the above step 103 and step 104 are repeated, similarly backup port numbers of the services 102, 103 and 104 are obtained and added into the service to be handed over temporary table, and the service running table is synchronously updated, Table 3-1 is an updated service running table, boldfaces in the table are updated contents.

TABLE 4

Service to be handed over temporary table

| Port number | Port service sequence |
|---|---|
| port 2 | 101-102 |
| port 4 | 103-104 |

TABLE 3-1

Service running table of portal

| Service | Current sending port information | |
|---|---|---|
| | Port number | Priority |
| 101 | port 2 | 2 |
| 102 | port 2 | 2 |
| 103 | port 4 | 2 |
| 104 | port 4 | 2 |
| 105 | port 2 | 1 |
| 106 | port 2 | 1 |
| 107 | port 3 | 1 |
| 108 | port 3 | 1 |
| 109 | port 4 | 1 |
| 110 | port 4 | 1 |

In step 106, the service to be handed over temporary table is orderly traversed, since the port 2 is a local port of the system A, the port service sequence of the port 2 in the Table 2A-1 is updated as "101~102, 105~106", and Table 2A-2 is the updated port service table.

TABLE 2A-2

Port service table of system A

| Port number | Port service sequence |
|---|---|
| port 1 | ~~101 - 104~~ |
| port 2 | 101-102, 105-106 |
| port 3 | 107-108 |

When it traverses to the port 4, since the port 4 is a port in the system B (not a local port of the system A), the system A sends a service handover message to the system B, the service handover message is used for making the system B update a local port service table, that is, the system B is notified to record a corresponding relationship between the port 4 and the service 103 and a corresponding relationship between the port 4 and the service 104, so that message forwarding can be implemented when there exist messages of the service 103 or service 104. A feasible service handover message format is shown as follows.

| | |
|---|---|
| Notification message type | 1 Byte |
| Notification message length | 2 Byte |
| Source system identifier | 6 Byte |
| Target system identifier | 6 Byte |
| Source port | 2 Byte |
| Target port | 2 Byte |
| Number of services to be handed over | 2 Byte |
| Service number sequence | Number of services to be handed over *2 Byte |
| . . . | |

In the example, the notification message type is "service handover", the source system identifier is "system A", the target system identifier is "system B", the source port number is "port 1", the target port is "port 4", the number of services to be handed over is 2, and the service number sequence is 103 and 104.

But the service handover message is not limited to using this format, for example, in other examples, the service handover message can only contain a target system identifier and a corresponding relationship between the service to be handed over and the target port (i.e. the backup port). The above corresponding relationship between the service to be handed over and the target port can be carried in the following way: a service to be handed over identifier and a target port identifier, and the system receiving the message defaults that there is a corresponding relationship between the two.

In step 107, the system B receives the message sent by the system A and promptly updates the port service table of the system B, Table 2B-1 is an updated port service table of the system B.

TABLE 2B-1

Port service table of system B

| Port number | Port service sequence |
|---|---|
| port 4 | 103-104, 109-110 |

Since the service message is forwarded by table lookup, update of the corresponding relationship between the port and the service is completed, when there exists a message of the service to be handed over, message forwarding can be implemented via a backup port corresponding to the service to be handed over, thereby implementing the service handover.

Application Example 2

It is assumed that the port 1 shown in FIG. 7 recovers from an unavailable state to an available state, and the portal 1 works in a revertive mode, then the Table 0-1 is updated to the Table 0. According to the Table 1, it is obtained that services that should be carried on the port 1 include services 101-104 and services 107-108, and the port 1 is the first priority port of the services 101-104 and the second priority port of the services 107-108.

In a situation that the port 1 is the first priority port bearing the services 101-104, a processing method for service switchback is described as follows.

For the services 101-104, since the port 1 is the first priority port for these services, a priority of the port 1 is inevitably higher than a priority of the port currently carrying the service (or called a current sending port, or called a current port for short), it is required to switch the first priority services of the port 1 back to the port 1, which includes the following steps.

In step 201, a service sequence of the port 1 in the Table 2A-2 is updated as 101~104.

In step 202, according to the Table 3-1, it is obtained that the current port of the services 101-102 is the port 2 and the current port of the services 103-104 is the port 4.

In step 203, since the port 2 is a local port, that is, the port 2 and the port 1 both belong to the system A, the port service table of the system A is directly updated to the state of the Table 2A.

In step 204, the service running table of the services 101-102 is updated to the state of the Table 3.

In step 205, since the port 4 is not a local port, that is, the port 4 and the port 1 do not belong to the same intra-end system, the system A sends a "service reverse switchback" message to the system B, the service reverse switchback message is used for making the system B update a local port service table, that is, the system B is notified of canceling a corresponding relationship between the port 4 and the service 103 and a corresponding relationship between the port 4 and the service 104. A feasible service handover message format is shown as follows.

| | |
|---|---|
| Notification message type | 1 Byte |
| Notification message length | 2 Byte |
| Source system identifier | 6 Byte |
| Target system identifier | 6 Byte |
| Source port | 2 Byte |
| Target port | 2 Byte |
| Number of services to be handed over | 2 Byte |
| Service number sequence | Number of services to be handed over *2 Byte |
| . . . | |

In the example, the notification message type is "service reverse switchback", the source system identifier is "system A", the target system identifier is "system B", the source port represents a port sending the service reverse switchback message, the target port represents a port receiving the message, in the example, the source port number is "port 1", the target port is "port 4", the number of services to be handed over is 2, and the service number sequence is 103 and 104.

In step 206, the current sending port information of the services 103-104 in the service running table is updated to the state of the Table 3.

In step 207, the system B receives the "service reverse switchback" message sent by the system A, and deletes 103 and 104 in the "Port service sequence" entries corresponding to the port 4 in the port service table of the system B, and the Table 2B-1 is updated to the state of the Table 2B.

For the services 107 and 108, "Table 3—Service running table of portal" is queried, it is obtained that the port currently carrying the service of the services 107-108 is the "port 3", and the port 3 is the first priority port of the services 107 and 108, but the port 1 is only the second priority port of the services 107 and 108, that is, the priority of the current port is greater than the priority of the port recovering to be available, thus no further processing is required at this point. But in other examples, if the priority of the port recovering to be available is higher than the priority of the current port, handover is still required, so as to guarantee that the service runs on the available port with the highest priority. For example, when the first priority port of a certain service is unavailable, and the second priority port is also in an unavailable state at this point, the service is directly switched from the first priority port to the third priority port, and when the second priority port recovers to be available, the service is switched from the third priority port to the second priority port, even though the second priority port is not an original port of the service.

Application Example 3

In order to better highlight the advantages of the present document, the following assumptions are made for the service port table of Portal 1 based on the application example 1 in the example.

TABLE 1-2

| Service port table of Portal 1 | |
|---|---|
| Service | Service port sequence |
| 101 | port 1, port 2, port 3, port 4 |
| 102 | port 1, port 2, port 3, port 4 |
| 103 | port 1, port 3, port 2, port 4 |
| 104 | port 1, port 3, port 2, port 4 |
| 105 | port 2, port 3, port 4, port 1 |
| 106 | port 2, port 3, port 4, port 1 |
| 107 | port 3, port 1, port 2 |
| 108 | port 3, port 1, port 2 |
| 109 | port 4, port 1, port 2, port 3 |
| 110 | port 4, port 1, port 2, port 3 |

That is, the second priority port of the service 103 and service 104 is the port 3 in the example. Descriptions are still made by taking the failure condition shown in FIG. 7 as an example, since both the port 2 and the port 3 are local ports, it is not required to send the message to the system B in step 106, and step 107 also can be omitted. The advantage thereof is that service handover can be completed in the system A and it is not required to interact with the system B in such scenario. In combination with the optimized network planning and configuration, message interaction within the same portal can be effectively reduced.

The object of reducing interaction is achieved by reasonably configuring the service port table in the above descriptions. Moreover, a reduction of interaction also can be implemented by improving the flow, for example, a port belonging to the same intra-end system with the unavailable port can be preferentially considered when selecting the backup port. In a word, a difference between the example and the example 1 is that, when it is to determine the backup port, a port with the highest priority in available ports belonging to the same intra-end system with the unavailable port of the service to be handed over in the port sequence configured for the service in advance is determined as the backup port in the example, but a port with the highest priority in available ports of the service to be handed over in the port sequence configured for the service in advance is directly determined as the backup port in the example 1.

Application Example 4

As shown in FIG. 1, in the example, the scenario is the same as that in the example 1, and the service configuration is also identical with that in the example 1, that is, information of the current aggregation group: Table 0, Table 1, Table 2A, Table 2B and Table 3 are the same as that in the example 1.

Figure 8:
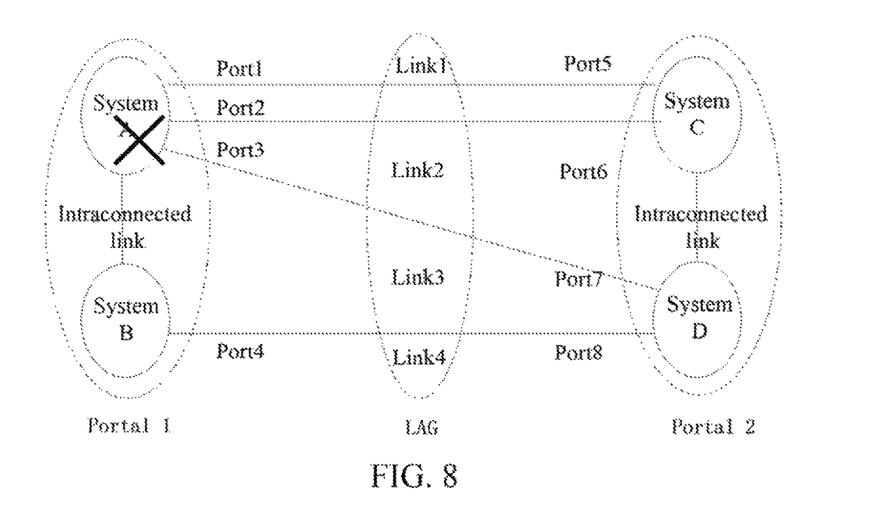
FIG. 8 is a schematic diagram of node failure.

But a difference between the example and the example 1 is that, as shown in FIG. 8, in the example, the system A has a failure, the system B detects that the system A has the failure, states of the port 1, port 2 and port 3 turn into unavailable, thus the system B is required to carry out necessary removal for the services in the system A at this point, and the following steps are specifically included.

In step 401, the system B updates states of all ports in the system A in the Table 0, and Table 0-3 is an updated port information table of the Portal 1.

TABLE 0-3

| Port information table of Portal1 | | | |
|---|---|---|---|
| Port number | Port state | System in which a port is located | . . . . . . |
| port 1 | unavailable | system A | |
| port 2 | unavailable | system A | |
| port 3 | unavailable | system A | |
| port 4 | available | system B | |

In step 402, the Table 1, Service port table of Portal1, is traversed, with respect to each service, an available port with the highest priority in the system B is selected, "Table 2B: Port service table" and "Table 3: Service running table of portal" are synchronously updated, Table 2B-2 and Table 3-2 are obtained.

TABLE 2B-2

| Port service table | |
|---|---|
| Port number | Port service sequence |
| port 4 | 101-106, 109-110 |

TABLE 3-2

| Service running table of portal | | |
|---|---|---|
| | Information of the Current sending port | |
| Service | Port number | Priority |
| 101 | port 4 | 4 |
| 102 | port 4 | 4 |
| 103 | port 4 | 2 |
| 104 | port 4 | 2 |
| 105 | port 4 | 3 |
| 106 | port 4 | 3 |
| 107 | — | — |
| 108 | — | — |
| 109 | port 4 | 1 |
| 110 | port 4 | 1 |

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or multiple integrated circuits. Correspondingly, each module/unit in the above examples can be implemented in a form of hardware, and also can be implemented in a form of software function module. The present document is not limited to any combination of hardware and software in a specific form.

The above examples are only used to describe the technical scheme of the present document, which does not limit the technical scheme of the present document. The present document is just described in detail with reference to the preferred examples. The ordinary person skilled in the art should understand that, with regard to the technical scheme of the present document, modifications or equivalent substitutions can be made without departing from the spirit and scope of the technical scheme of the present document, and all these modifications and equivalent substitutions should be covered within the scope of the claims of the present document.

INDUSTRIAL APPLICABILITY

The present document provides a distributed LAG protection method and device for performing message distribution based on the service, when an LAG member is changed, a corresponding relationship between the port and the service can be dynamically updated, which enables the service influenced by the failure to be swiftly handed over to other links for transmission. With the present document, the influence on an adjacent system is minimized in a service handover process, which greatly improves both performance and efficiency.

What is claimed is:

1. A method for distributed Link Aggregation Group (LAG) service handover, comprising:
when an unavailable port appears in a distributed link aggregation intra-end system, determining, by the intra-end system, a service currently corresponding to the unavailable port as a service to be handed over; when an unavailable intra-end system appears in a distributed link aggregation portal, determining, by an adjacent intra-end system of the intra-end system, a service currently corresponding to the unavailable intra-end system as a service to be handed over;
determining, by the intra-end system that determines the service to be handed over, a backup port of the service to be handed over according to a port sequence configured for the service to be handed over in advance; and
canceling a corresponding relationship between the service to be handed over and the unavailable port;
wherein the method further comprises:
when the unavailable port appears in the distributed link aggregation intra-end system, establishing a corresponding relationship between the service to be handed over and the backup port by using judgment on whether the backup port and the unavailable port belong to a same intra-end system;
when the unavailable intra-end system appears in the distributed link aggregation portal, establishing a corresponding relationship between the service to be handed over and the backup port by using judgment on whether the backup port belongs to the current system or belongs to other intra-end systems belonging to a same portal with the current intra-end system.

2. The method according to claim 1, wherein:
when the unavailable port appears in the distributed link aggregation intra-end system, establishing a corresponding relationship between the service to be handed over and the backup port by using judgment on whether the backup port and the unavailable port belong to a same intra-end system comprises:
if judging that the backup port and the unavailable port belong to a same intra-end system, establishing the corresponding relationship between the service to be handed over and the backup port; and
if judging that the backup port and the unavailable port do not belong to the same intra-end system, sending a service handover message to an intra-end system to which the backup port belongs, wherein the service handover message is set to make the intra-end system to which the backup port belongs establish the corresponding relationship between the service to be handed over and the backup port.

3. The method according to claim 2, wherein:
the service handover message comprises the following information: a target system identifier and a corresponding relationship between the service to be handed over and the backup port.

4. The method according to claim 3, wherein:
the service handover message further comprises one or more of the following information: a source system identifier and information of the unavailable port.

5. The method according to claim 1, wherein:
when the unavailable intra-end system appears in the distributed link aggregation portal, establishing a corresponding relationship between the service to be handed over and the backup port by using judgment on whether the backup port belongs to the current system or belongs to other intra-end systems belonging to a same portal with the current intra-end system comprises:
if judging that the backup port belongs to the current system, establishing the corresponding relationship between the service to be handed over and the backup port; and if judging that the backup port belongs to other intra-end systems belonging to a same portal with the current intra-end system, sending a service handover message to the intra-end system to which the backup port belongs, wherein the service handover message is set to make the intra-end system to which the backup port belongs establish the corresponding relationship between the service to be handed over and the backup port.

6. The method according to claim 1, wherein:
determining a backup port of the service to be handed over according to a port sequence configured for the service to be handed over in advance comprises:
determining a port with a highest priority in available ports of the service to be handed over in the port sequence configured for the service to be handed over in advance as the backup port; or
determining a port with a highest priority in available ports belonging to a same intra-end system with the unavailable port of the service to be handed over in the port sequence configured for the service to be handed over in advance as the backup port.

7. The method according to claim 1, further comprising:
when the unavailable port recovers to be available, and an LAG runs in a revertive mode where the revertive mode indicates a mode in which the service to be handed over is restored to the unavailable port when the unavailable port recovers to be available, an intra-end system to which the port recovering to be available belongs checking a service that should be carried on the port recovering to be available and a priority of the port recovering to be available in a port sequence configured for the service in advance, with respect to each the service, if the intra-end system judges that the priority of the port recovering to be available in the port sequence configured for the service in advance is greater than a priority of a port currently carrying the service in the port sequence configured for the service in advance, canceling a corresponding relationship between the service and the port currently carrying the service, and establishing a corresponding relationship between the service and the port recovering to be available; or when the unavailable intra-end system recovers to be available, and the LAG runs in a revertive mode where the revertive mode indicates a mode in which the service to be handed over is restored to the unavailable intra-end system when the unavailable intra-end system recovers to be available, the intra-end system recovering to be available checking a service that should be carried on the current intra-end system and a priority of an available port of the current intra-end system in a port sequence configured for the service in advance, with respect to each the service, if the intra-end system judges that the priority of the available port of the current intra-end system in the port sequence configured for the service in advance is greater than a priority of a port currently carrying the service in the port sequence configured for the service in advance, canceling a corresponding relationship between the service and the port currently carrying the service, and establishing a corresponding relationship between the service and the available port of the current intra-end system.

8. The method according to claim 7, wherein:

an intra-end system to which the port recovering to be available belongs canceling a corresponding relationship between the service and the port currently carrying the service, and establishing a corresponding relationship between the service and the port recovering to be available comprises:

if judging that the port recovering to be available and the port currently carrying the service belong to the same intra-end system, canceling the corresponding relationship between the service and the port currently carrying the service, and establishing the corresponding relationship between the service and the port recovering to be available; and if judging that the port recovering to be available and the port currently carrying the service do not belong to the same intra-end system, reestablishing the corresponding relationship between the service and the port recovering to be available, and sending a service reverse switchback message to an intra-end system to which the port currently carrying the service belongs, wherein the service reverse switchback message is set to make the intra-end system to which the port currently carrying the service belongs cancel the corresponding relationship between the service and the port currently carrying the service;

wherein, the service reverse switchback message comprises the following information: a source system identifier, a target system identifier and a corresponding relationship between the service and the port recovering to be available;

wherein, the service reverse switchback message further comprises one or more of the following information: a source system identifier and information of the port currently carrying the service.

9. The method according to claim 7, wherein:
the intra-end system recovering to be available canceling a corresponding relationship between the service and the port currently carrying the service, and establishing a corresponding relationship between the service and the available port of the current intra-end system comprises:

establishing the corresponding relationship between the service and the available port of the current intra-end system, and sending a service reverse switchback message to an intra-end system to which the port currently carrying the service belongs, wherein the service reverse switchback message is set to make the intra-end system to which the port currently carrying the service belongs cancel the corresponding relationship between the service and the port currently carrying the service;

wherein, the service reverse switchback message comprises the following information: a source system identifier, a target system identifier and a corresponding relationship between the service and the port recovering to be available;

wherein, the service reverse switchback message further comprises one or more of the following information: a source system identifier and information of the port currently carrying the service.

10. A device for distributed Link Aggregation Group (LAG) service handover, located in a distributed link aggregation intra-end system, and comprising: a processor, and a non-transitory computer readable medium storing a service to be handed over determination module and a corresponding relationship reestablishment module, wherein:

the service to be handed over determination module, when executed by the processor, causes the processor to: when an unavailable port appears in the current distributed link aggregation intra-end system, determine a service currently corresponding to the unavailable port as a service to be handed over; and when an adjacent intra-end system is unavailable, determine a service currently corresponding to the unavailable intra-end system as a service to be handed over; and the corresponding relationship reestablishment module, when executed by the processor, causes the processor to: determine a backup port of the service to be handed over according to a port sequence configured for the service to be handed over in advance, cancel a corresponding relationship between the service to be handed over and the unavailable port, and establish a corresponding relationship between the service to be handed over and the backup port by using judgment on whether the backup port and the unavailable port belong to a same intra-end system when the unavailable port appears in the distributed link aggregation intra-end system, and establish a corresponding relationship between the service to be handed over and the backup port by using judgment on whether the backup port belongs to the current system or belongs to other intra-end systems belonging to a same portal with the current intra-end system when the unavailable intra-end system appears in the distributed link aggregation portal.

11. The device according to claim 10, wherein:
the corresponding relationship reestablishment module comprises a backup port determination submodule, a first judgment submodule, a first reestablishment submodule and a second reestablishment submodule, wherein:

the backup port determination submodule is configured to: determine the backup port of the service to be handed over according to the port sequence configured for the service to be handed over in advance;

the first judgment submodule is configured to: when the unavailable port appears in the current distributed link aggregation intra-end system, judge whether the backup port and the unavailable port belong to a same intra-end system;

the first reestablishment submodule is configured to: when the first judgment submodule judges that the backup port and the unavailable port belong to the same intra-end system, cancel the corresponding relationship between the service to be handed over and the unavailable port, and establish the corresponding relationship between the service to be handed over and the backup port; and the second reestablishment submodule is configured to: when the first judgment submodule judges that the backup port and the unavailable port do not belong to the same intra-end system, cancel the corresponding relationship between the service to be handed over and the unavailable port, and send a service handover message to an intra-end system to which the backup port belongs, wherein the service handover message is set to make the intra-end system to which the backup port belongs establish the corresponding relationship between the service to be handed over and the backup port.

12. The device according to claim 11, wherein:
the service handover message comprises the following information: a target system identifier and a corresponding relationship between the service to be handed over and the backup port.

13. The device according to claim 12, wherein:
the service handover message further comprises one or more of the following information: a source system identifier and information of the unavailable port.

14. The device according to claim 10, wherein:
the corresponding relationship reestablishment module comprises a backup port determination submodule, a second judgment submodule, a third reestablishment submodule, a fourth reestablishment submodule and a fifth reestablishment submodule, wherein:

the backup port determination submodule is configured to: determine the backup port of the service to be handed over according to the port sequence configured for the service to be handed over in advance;

the third reestablishment submodule is configured to: when the adjacent intra-end system is unavailable, cancel the corresponding relationship between the service to be handed over and the unavailable port;

the second judgment submodule is configured to: when the adjacent intra-end system is unavailable, judge whether the backup port belongs to the current system;

the fourth reestablishment submodule is configured to: when the second judgment submodule judges that the backup port belongs to the current system, establish the corresponding relationship between the service to be handed over and the backup port; and the fifth reestablishment submodule is configured to: when the second judgment submodule judges that the backup port belongs to other intra-end systems belonging to a same portal with the current intra-end system, send a service handover message to the intra-end system to which the backup port belongs, wherein the service handover message is set to make the intra-end system to which the backup port belongs establish the corresponding relationship between the service to be handed over and the backup port.

15. The device according to claim 10, wherein:
the corresponding relationship reestablishment module determining a backup port of the service to be handed over according to a port sequence configured for the service to be handed over in advance comprises:

determining a port with a highest priority in available ports of the service to be handed over in the port sequence configured for the service to be handed over in advance as the backup port; or determining a port with a highest priority in available ports belonging to a same intra-end system with the unavailable port of the service to be handed over in the port sequence configured for the service to be handed over in advance as the backup port.

16. The device according to claim 10, wherein the non-transitory computer readable medium further stores:
a first switchback module when executed by the processor, causing the processor to: when the unavailable port recovers to be available and an LAG runs in a revertive mode where the revertive mode indicates a mode in which the service to be handed over is restored to the unavailable port when the unavailable port recovers to be available, check a service that should be carried on the port recovering to be available and a priority of the port recovering to be available in a port sequence configured for the service in advance, with respect to each the service, if judging that the priority of the port recovering to be available in the port sequence configured for the service in advance is greater than a priority of a port currently carrying the service in the port sequence configured for the service in advance, cancel a corresponding relationship between the service and the port currently carrying the service, and establish a corresponding relationship between the service and the port recovering to be available.

17. The device according to claim 16, wherein:
the first switchback module canceling a corresponding relationship between the service and the port currently carrying the service, and establishing a corresponding relationship between the service and the port recovering to be available comprises:

if judging that the port recovering to be available and the port currently carrying the service belong to the same intra-end system, canceling the corresponding relationship between the service and the port currently carrying the service, and establishing the corresponding relationship between the service and the port recovering to be available; and if judging that the port recovering to be available and the port currently carrying the service do not belong to the same intra-end system, reestablishing the corresponding relationship between the service and the port recovering to be available, and sending a service reverse switchback message to an intra-end system to which the port currently carrying the service belongs, wherein the service reverse switchback message is set to make the intra-end system to which the port currently carrying the service belongs cancel the corresponding relationship between the service and the port currently carrying the service.

18. The device according to claim 17, wherein:
the service reverse switchback message comprises the following information: a source system identifier, a target system identifier and a corresponding relationship between the service and the port recovering to be available;

wherein, the service reverse switchback message further comprises one or more of the following information: a source system identifier and information of the port currently carrying the service.

19. The device according to claim 10, wherein the non-transitory computer readable medium further stores
a second switchback module when executed by the processor, causing the processor to: when the current intra-end system recovers to be available from an unavailable intra-end system and an LAG runs in a revertive mode where the revertive mode indicates a mode in which the service to be handed over is restored to the current intra-end system when the current intra-end system recovers to be available, check a service that should be carried on the current intra-end system and a priority of an available port of the current intra-end system in a port sequence configured for the service in advance, with respect to each the service, if judging that the priority of the available port of the current intra-end system in the port sequence configured for the service in advance is greater than a priority of a port currently carrying the service in the port sequence configured for the service in advance, cancel a corresponding relationship between the service and the port currently carrying the service, and establish a corresponding relationship between the service and the available port of the current intra-end system.

20. The device according to claim 19, wherein:
the second switchback module canceling a corresponding relationship between the service and the port currently carrying the service, and establishing a corresponding relationship between the service and the available port of the current intra-end system comprises:
establishing the corresponding relationship between the service and the available port of the current intra-end system, and sending a service reverse switchback message to an intra-end system to which the port currently carrying the service belongs, wherein the service reverse switchback message is set to make the intra-end system to which the port currently carrying the service belongs cancel the corresponding relationship between the service and the port currently carrying the service.

* * * * *